United States Patent
Shirasaki

[11] Patent Number: 5,838,849
[45] Date of Patent: Nov. 17, 1998

[54] OPTICAL COMPONENT WHEREIN EITHER AN OPTICAL FIELD DISTRIBUTION OF RECEIVED LIGHT OR AN OPTICAL FIELD DISTRIBUTION OF A PROPAGATION MODE OF A RECEIVING WAVEGUIDE HAS A DOUBLE-HUMP SHAPE

[75] Inventor: Masataka Shirasaki, Kawasaki, Japan

[73] Assignee: Fujitsu Limited, Kawasaki, Japan

[21] Appl. No.: 802,767

[22] Filed: Feb. 21, 1997

[30] Foreign Application Priority Data

Mar. 22, 1996 [JP] Japan .................................. 8-066718

[51] Int. Cl.$^6$ ...................................... G02B 6/26
[52] U.S. Cl. ................. 385/31; 385/46; 385/33; 385/37; 385/36; 385/45; 385/43
[58] Field of Search ................. 385/31, 33, 34, 385/35, 45, 36, 37, 46, 43

[56] References Cited

FOREIGN PATENT DOCUMENTS

| 54-21748 | 2/1979 | Japan | 385/43 |
| 54-157634 | 12/1979 | Japan | 385/34 |
| 54-158242 | 12/1979 | Japan | 385/34 |
| 54-159239 | 12/1979 | Japan | 385/34 |
| 1318972 | 6/1987 | U.S.S.R. | 385/43 |

OTHER PUBLICATIONS

Watanabe et al; "New 2–Channel Multiplexer Using Polarization"; Electronic Letters, 5th Feb. 1981, vol. 17 No. 3; pp.133–135.

M. Shirasaki, *Temperature Independent Interferometer For WDM Filters*, Paper WeD.1.6 ECOC '96 (European Conference on Optical Communication), Sep. 18, 1996.

M. Shirasaki, *Filtering Characteristics of Virtually–Imaged Phased Array*, Presented at IPR (Integrated Photonics Research) Topical Meeting Paper IMC3, Apr. 29, 1996, Boston, MA.

*Primary Examiner*—John Ngo
*Attorney, Agent, or Firm*—Staas & Halsey

[57] ABSTRACT

An optical waveguide having a light receiving end and a propagation mode with a double-hump shaped optical field distribution at the light receiving end to receive light into the optical waveguide. The light incident on the light receiving end typically has a single-hump shaped optical field distribution. Overlap in the optical field distribution of the incident light and the optical field distribution of the propagation mode of the optical waveguide causes the light to be received by the optical waveguide. Alternatively, the optical waveguide can have a propagation mode with a single-hump shaped optical field distribution at the light receiving end, and the incident light can have a double-hump shaped optical field distribution at the light receiving end. These configuration provide a much greater range of transmission as compared to a typical case where the incident light has a single-hump shaped optical field distribution and the waveguide has a propagation mode with a single-hump shaped optical field distribution at the light receiving end. The present invention is especially useful for use in an optical multiplexer or an optical demultiplexer which uses an angular dispersion element, such as a diffraction grating.

38 Claims, 13 Drawing Sheets

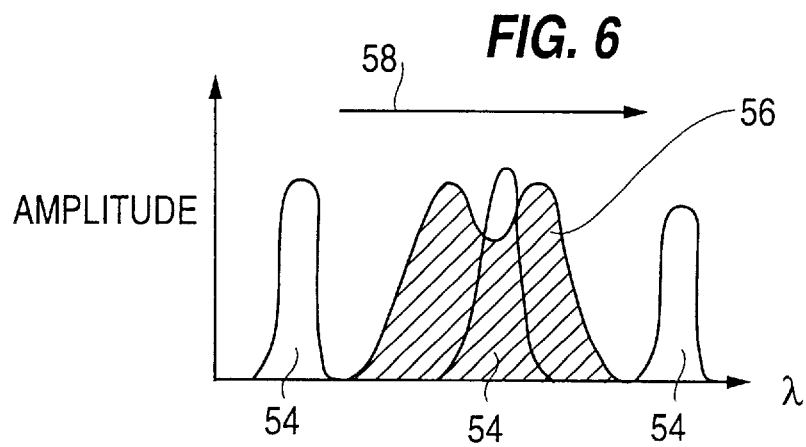
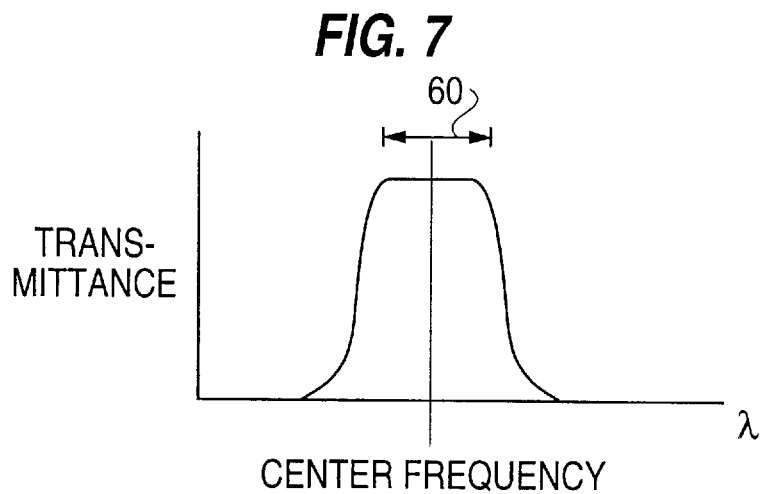
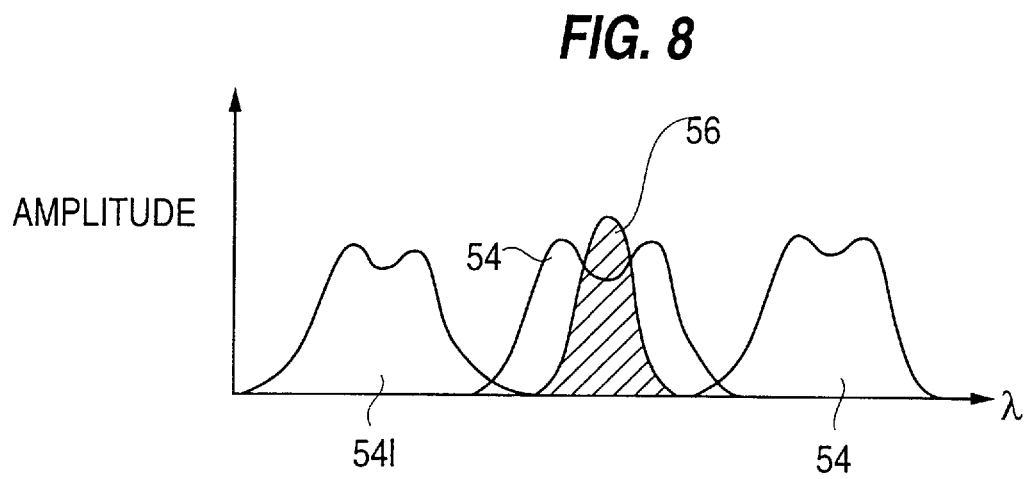

OPTICAL COMPONENT WHEREIN EITHER AN OPTICAL FIELD DISTRIBUTION OF RECEIVED LIGHT OR AN OPTICAL FIELD DISTRIBUTION OF A PROPAGATION MODE OF A RECEIVING WAVEGUIDE HAS A DOUBLE-HUMP SHAPE

CROSS-REFERENCE TO RELATED APPLICATIONS

This application is based on, and claims priority to, Japanese application number 08-66718, filed Mar. 22, 1996, in Japan, and which is incorporated herein by reference.

BACKGROUND OF THE INVENTION

1. Field of the Invention

The present invention relates to an optical component, such as an optical multiplexer or an optical demultiplexer, which includes an optical waveguide, wherein either an optical field distribution of light received by the optical waveguide or an optical field distribution of a propagation mode of the optical waveguide has a double-hump shape to expand the transmission band of light transmitted to the optical waveguide.

2. Description of the Related Art

Wavelength division multiplexing is used in fiber optic communication systems to transfer a relatively large amount of data at a high speed.

FIG. 1 is a diagram illustrating a conventional fiber optic communication system which uses wavelength division multiplexing to transmit, for example, four channels through a single optical fiber. Referring now to FIG. 1, transmitting units 20-1, 20-2, 20-3 and 20-4 transmit individual carriers having wavelengths λ1–λ4, respectively. Each carrier is modulated with information and represents an individual channel. The different carriers are multiplexed together by an optical multiplexer 22 into a wavelength division multiplexed light. The wavelength division multiplexed light is transmitted through an optical fiber 24 to an optical demultiplexer 26. Optical demultiplexer 26 branches the wavelength division multiplexed light into four separate optical signals having the wavelengths λ1–λ4, respectively. The four separate branched optical signals are then detected by receiving units 28-1, 28-2, 28-3 and 28-4, respectively.

While the above optical fiber communication system multiplexes four carriers together, it is common practice to multiplex more than four carriers. More specifically, many different carriers may be multiplexed together, where the frequencies of the carriers are relatively close together in a narrow frequency band. In this manner, a relatively large amount of data can be transmitted through an optical fiber.

To multiplex many different carriers together, an extremely precise optical multiplexer is required. Similarly, to branch, or demultiplex, a wavelength division multiplexed light into separate optical signals, and extremely precise optical demultiplexer is required. An angular dispersion element having an output angle dependent on wavelength is typically used as part of such an optical multiplexer and optical demultiplexer.

FIG. 2 is a diagram illustrating a conventional optical demultiplexer which uses an angular dispersion element. Referring now to FIG. 2, an input fiber 30 receives an optical signal transmitted via optical fiber 24 (not illustrated in FIG. 2, but see FIG. 1). The optical signal is collimated into parallel lights by a collimating lens 32. The parallel lights contain optical signals having, for example, four different carrier wavelengths. The parallel lights are then provided to an angular dispersion element 34.

Angular dispersion element 34 produces optical signals which travel in a different direction depending on wavelength. Therefore, if the parallel lights received by angular dispersion element 34 include four wavelengths, then angular dispersion element 34 will produce four separate optical signals which travel in different directions. That is, each optical signal has a different output angle from angular dispersion element 34.

The output signals dispersed from angular dispersion element 34 are collected by a collective lens 36 and focused to a plurality of output fibers 38-1 to 38-N for receiving the optical signals of different wavelengths. For example, the light output in direction 42 from angular dispersion element 34 has a specific wavelength and is focused by collective lens 36 to output fiber 38-1. Similarly, the light output in direction 44 from angular dispersion element 34 is focused by collective lens 36 to output fiber 38-N. Thus, optical signals having different wavelengths and output in different directions by angular dispersion element 34 are provided to different output fibers. In this manner, individual carriers can be separated from a wavelength division multiplexed light.

While FIG. 2 illustrates the operation of an optical demultiplexer which uses an angular dispersion element, an optical multiplexer which uses an angular dispersion element operates in a similar manner, except in reverse. More specifically, a plurality of different carriers are combined by angular dispersion element 34 into a collimated light which is focused by collimating lens 32 to a fiber.

FIG. 3 is a diagram illustrating the focusing of light by collective lens 32 and the reception of light by optical fibers 38-1 to 38-N. More specifically, FIG. 3 shows the optical field distribution 44 of light focused by collective lens 32 and the optical field distributions 46 of propagation modes of output fibers 38-1 to 38-N. The optical field distribution of a prorogation mode of an output fiber may hereinafter simply be referred to as the optical field distribution of the output fiber.

Referring now to FIG. 3, the output angle of light output from angular dispersion element 34 (not illustrated in FIG. 3, but see FIG. 2) changes as the wavelength of the light changes. Therefore, light having different wavelengths will be focused to different output fibers 38-1 to 38-N. As the wavelength of the light focused by collective lens 32 changes, the focusing point of the light will move in the direction 48. Light will be received by a respective output fiber 38-1 to 38-N when there is overlap between the optical field distribution 44 of the collected light and the optical field distribution 46 of the respective output fiber.

FIG. 4 is a graph illustrating how overlap occurs between the optical field distribution 44 of the collected light and the optical field distribution 46 of a respective output fiber. In FIG. 4, the horizontal axis indicates a distance x along direction 48 (see FIG. 3). Referring now to FIG. 4, the position of the optical field distribution 46 of each output fiber 38-1 to 38-N is fixed along the direction 48. However, the position of the optical field distribution 44 of the collected light changes in the direction 48 depending on the wavelength of the light. Such change in position is indicated by arrow 50 in FIG. 4. Light will be received by a respective output fiber 38-1 to 38-N when there is overlap between the optical field distribution 44 of the collected light and the optical field distribution 46 of the respective output fiber. Therefore, as the optical field distribution 44 of the collected light is shifted as indicated by arrow 50, the amount of overlap with the optical field distribution 46 of a respective output fiber will change. The transmittance of the collected light to the output fiber increases as the amount of overlap increases.

FIG. 5 is a graph illustrating the transmittance of light to a respective output fiber versus the wavelength of the light. As shown in FIG. 5, a high transmittance of collected light to a respective output fiber occurs for a relatively narrow wavelength transmission band 52.

Moreover, when information is modulated on a carriers by, for example, frequency modulation, the peak of the modulated carrier signal will be shifted off the center frequency of the carrier. As a result, as can be seen from FIG. 5, the transmittance of the modulated carrier signal will unfortunately be reduced. Further, the light as received by output fibers 38-1 to 38-N may be distorted due to non-uniform transmittance of the light to the output fibers.

Moreover, in practice, it is very difficult to precisely set the wavelength of a carrier or of a modulated carrier signal. Therefore, the relative narrow wavelength transmission band 52 illustrated in FIG. 5 causes significant difficulties in the transmission of light, especially when the wavelength of the light is slightly shifted.

SUMMARY OF THE INVENTION

Accordingly, it is an object of the present invention to provide a fiber optic communication system having a relatively large transmission band, where the fiber optic communication system uses an angular dispersion element in an optical multiplexer or an optical demultiplexer.

It is a further object of the present invention to expand the transmission band of light transmitted to an optical fiber, and especially of light transmitted from an angular dispersion element to the optical fiber.

Additional objects and advantages of the invention will be set forth in part in the description which follows, and, in part, will be obvious from the description, or may be learned by practice of the invention.

The foregoing objects of the present invention are achieved by providing an optical waveguide having a light receiving end and a propagation mode with a double-hump shaped optical field distribution at the light receiving end to receive light into the optical waveguide.

Objects of the present invention are further achieved by providing an apparatus which includes an angular dispersion element and an optical waveguide. The angular dispersion element receives an input light and produces an output light having an output angle corresponding to the wavelength of the input light. The optical waveguide has a light receiving end and a propagation mode with a double-hump shaped optical field distribution at the light receiving end. The output light of the angular dispersion element is incident on the light receiving end of the optical waveguide to be received in the optical waveguide.

Objects of the present invention are further achieved by providing a transforming device through which a light travels to a receiving surface. The transforming device transforms the optical intensity distribution of the light so that the light has a double-hump shaped optical intensity distribution at the light receiving surface.

In addition, objects of the present invention are achieved by providing an apparatus which includes an angular dispersion element and a transforming device. The angular dispersion element receives an input light and produces an output light having an output angle corresponding to the wavelength of the input light. The output light has an optical intensity distribution and is provided to a receiving surface of an optical path. The transforming device transforms the optical intensity distribution of the output light so that the output light has a double-hump shaped optical intensity distribution at the light receiving surface of the optical path.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 is a graph illustrating overlap between an optical field distribution of light focused by a collective lens and an optical field distribution in an optical fiber, according to an embodiment of the present invention.

FIG. 7 is a graph illustrating the transmittance of light to a respective output fiber versus the wavelength of the light, when the optical field distribution of an output fiber has a double-humped shape, according to an embodiment of the present invention.

FIG. 8 is a diagram illustrating a case where an optical field distribution of collected lights has a double-humped shape, according to an embodiment of the present invention.

DESCRIPTION OF THE PREFERRED EMBODIMENTS

Figure 1:
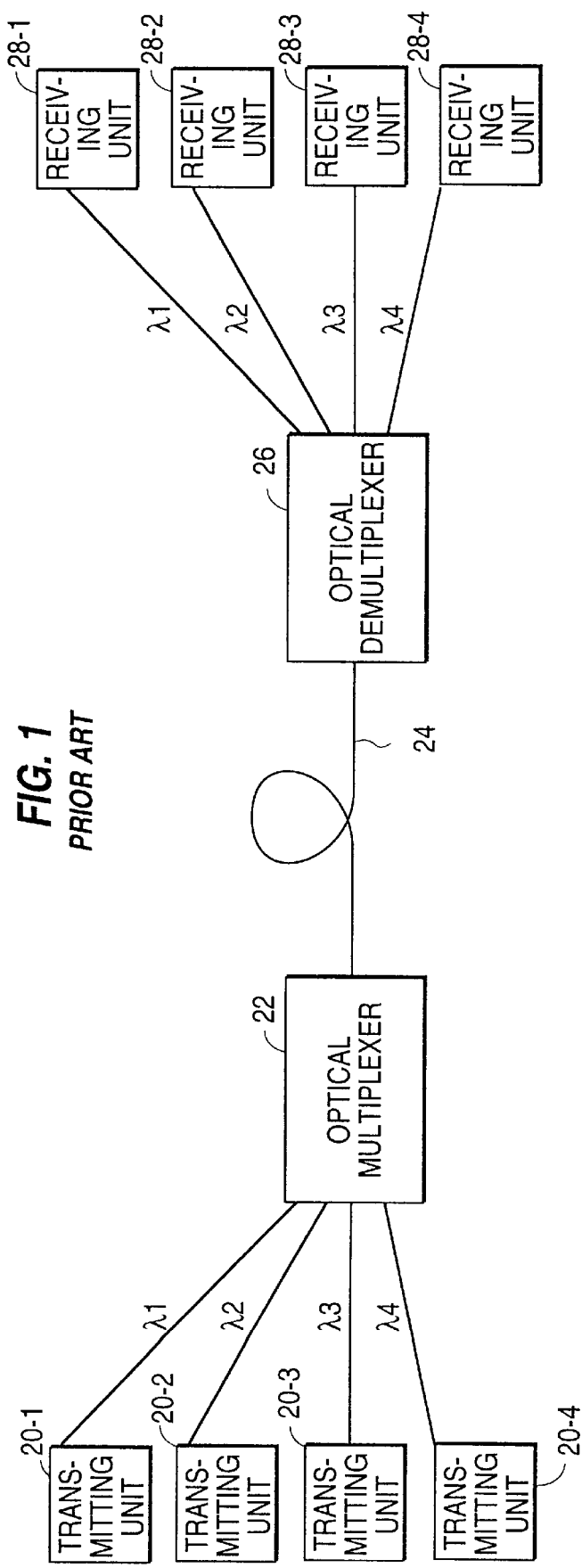
FIG. 1 (prior art) is a diagram illustrating a conventional fiber optic communication system which uses wavelength division multiplexing to transmit channels through a single optical fiber.

Reference will now be made in detail to the present preferred embodiments of the present invention, examples of which are illustrated in the accompanying drawings, wherein like reference numerals refer to like elements throughout.

According to the embodiments of the present invention, an optical demultiplexer includes a plurality of output fibers, where each output fiber has a propagation mode with a double-hump shaped optical field distribution. Moreover, an output fiber having a propagation mode with a double-hump shaped optical field distribution may hereafter be referred to an as optical fiber having a double-humped shaped optical field distribution. In addition, the terms "double-humped shape", "double-humped form" and "double-humped profile" may be used interchangeably.

Figure 2:
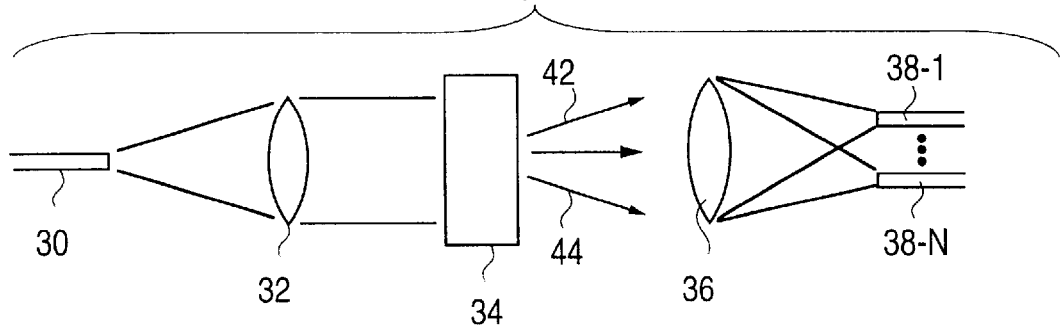
FIG. 2 (prior art) is a diagram illustrating a conventional optical demultiplexer which uses an angular dispersion element.
Figure 3:
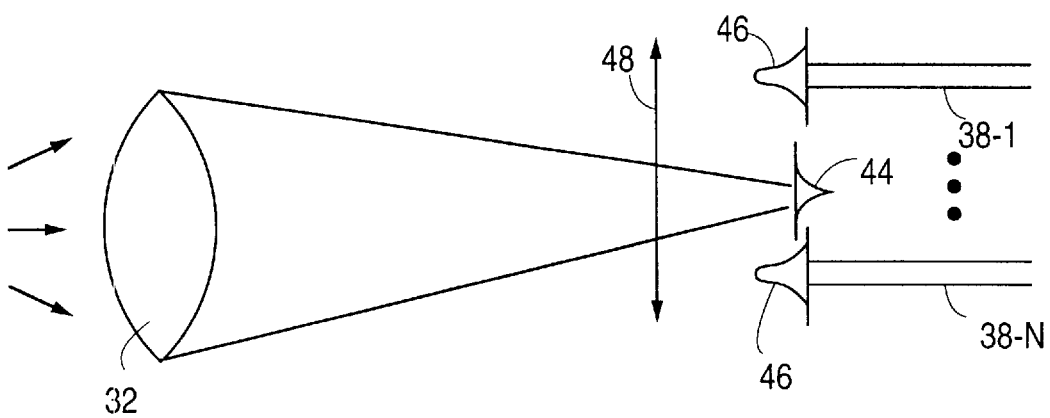
FIG. 3 (prior art) is a diagram illustrating the focusing of light by a lens and the reception of light by an optical fiber of the optical demultiplexer illustrated in FIG. 2.
Figure 4:
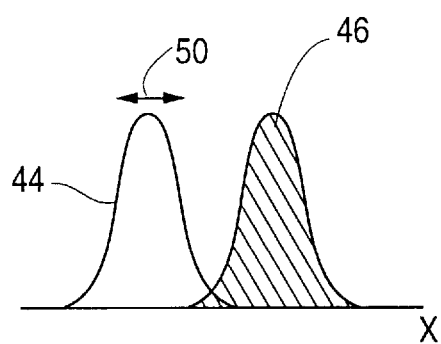
FIG. 4 is a graph illustrating how overlap occurs between the optical field distribution of collected light and the optical field distribution in an output fiber of the optical demultiplexer illustrated in FIG. 2.

FIG. 6 is a graph illustrating how overlap occurs between an optical field distribution 54 of light collected by a collective lens (such as collective lens 36 in FIG. 2) of an optical demultiplexer and an optical field distribution 56 in each output fiber of the optical demultiplexer, according to an embodiment of the present invention. As illustrated in FIG. 6, the optical field distribution 56 in each output fiber has a "double-hump shape" when viewed, for example, from the optical incident direction (that is, for example, in FIG. 2, from collective lens 32 in the direction of angular dispersement by angular dispersion element 34). An optical field distribution is defined as having a "double-humped shape" when, referring to FIG. 6, the optical field distribution has first and second humps having first and second peaks, respectively. The first and second peaks are symmetrically arranged with respect to a center point. The first and second humps overlap and the lowest amplitude between the first and second peaks of the overlapping humps is at the center point. Preferably, although not required, the optical field distribution has a substantially constant phase.

As illustrated by an arrow 58 in FIG. 6, the optical field distribution 54 of the collected light in an optical demultiplexer is shifted as the wavelength of the light changes, since the collected light is output from an angular dispersion element (such as angular dispersion element 34 in FIG. 2) which produces a change of output angle corresponding to the wavelength of the light. As the optical field distribution 54 of the collected light is shifted, overlap will occur with the optical field distribution 56 of a respective output fiber. The overlap allows the collected light to be received into the output fiber.

Figure 5:
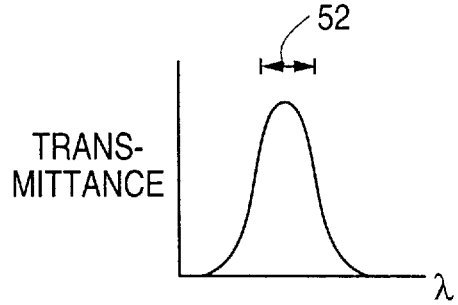
FIG. 5 is a graph illustrating the transmittance of light to a respective output fiber versus the wavelength of the light, of the optical demultiplexer illustrated in FIG. 2.

FIG. 7 is a graph illustrating the transmittance of light to a respective output fiber versus the wavelength of the light, when the optical field distribution of an output fiber has a double-humped shape, according to an embodiment of the present invention. More specifically, FIG. 7 is a graph illustrating the square of the overlap integral of the optical field distribution 54 of the collected lights and the optical field distribution 56 of an output fiber as illustrated in FIG. 6. In this case, as illustrated in FIG. 7, the frequency dependency of the transmittance have a relative even, wide range 60, as compared to the narrow wavelength transmission band 52 illustrated in FIG. 5 for a conventional optical demultiplexer. That is, the transmittance versus wavelength characteristics in FIG. 7 have a form which approaches a rectangular shape, thereby providing a relatively high transmittance to an optical fiber of light which is shifted from its center frequency.

In the case shown in FIG. 6, the effective optical field distribution 56 of an output fiber indicates a double-humped shape in the varying direction of the collected lights with the change in wavelength. However, a similar effect can be obtained by transforming the optical field distribution 54 of the collected lights to have a double-humped shape.

More specifically, FIG. 8 is a diagram illustrating a case where the optical field distribution 54 of the collected lights has a double-humped shape and the optical field distribution 56 of each output fiber indicates a single-hump shape. Referring now to FIG. 8, since the optical field distribution 54 of the collected lights has a double-humped shape, the transmittance of the collected lights to an output fiber is maintained to be constant in a wide range, as illustrated in FIG. 7, in accordance with the overlap between the optical field distribution 56 of the output fiber and the optical field distribution 54 of the collected lights. Therefore, the effect of an embodiment of the present invention illustrated in FIG. 8 is similar to the effect of an embodiment of the present invention illustrated in FIG. 6.

Figure 9:
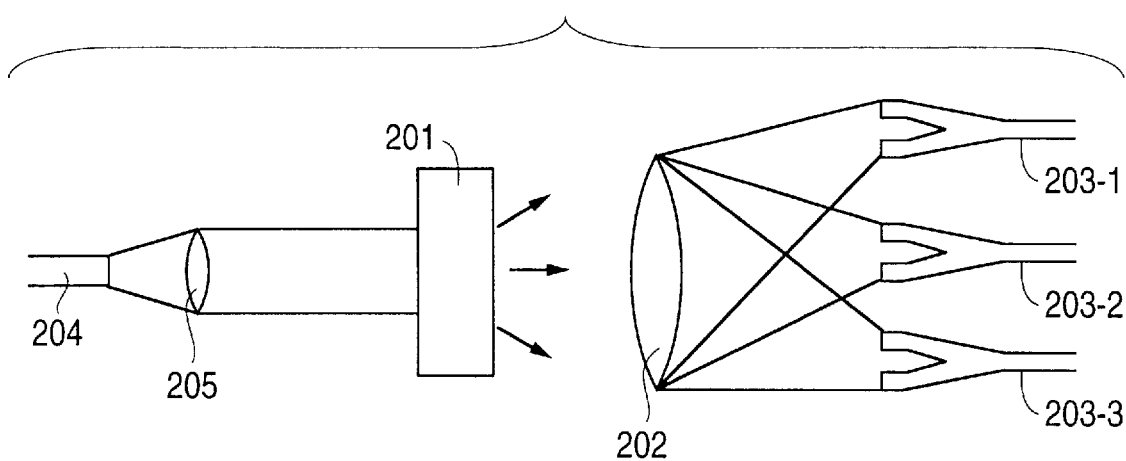
FIG. 9 is a diagram illustrating an optical demultiplexer which uses a angular dispersion element, according to an embodiment of the present invention.

FIG. 9 is a diagram illustrating an optical demultiplexer which uses a angular dispersion element, according to an embodiment of the present invention. Referring now to FIG. 9, an optical signal travels through an input fiber 204 and is converted into parallel lights by a collimating lens 205. The optical signal is then angularly dispersed by an angular dispersion element 201. More specifically, angular dispersion element 201 receives the optical signal and forms an output light for each wavelength of the optical signal, where each output light travels in a different direction in accordance with the wavelength of the output light. The output lights formed by angular dispersion element 201 are collected by a collective lens 202 and focused to a respective output fiber 203-1, 203-1 or 203-3. Therefore, since each output light formed by angular dispersion element 201 travels in a different direction than the other output lights, the output lights will be focused by collective lens 202 at different points so that each output light is received by a different output fiber 203-1 to 203-3. Each output fiber 203-1 to 203-3 is connected to a receiver (not illustrated) to detect the light received by the respective output fiber.

The optical demultiplexer illustrated in FIG. 9 is generally for use with a wavelength division multiplexed light which includes three channels. Therefore, three output fibers are provided at different focusing points of collective lens 201. However, the present invention is not intended to be limited to the use of three output fibers. Instead, virtually any number of output fibers can be used, in accordance with the number of channels in the wavelength division multiplexed light. Generally, the number of output fibers should be equal to the number of channels in the wavelength division multiplexed light, where each output fiber is intended to receive one channel.

Figure 10:
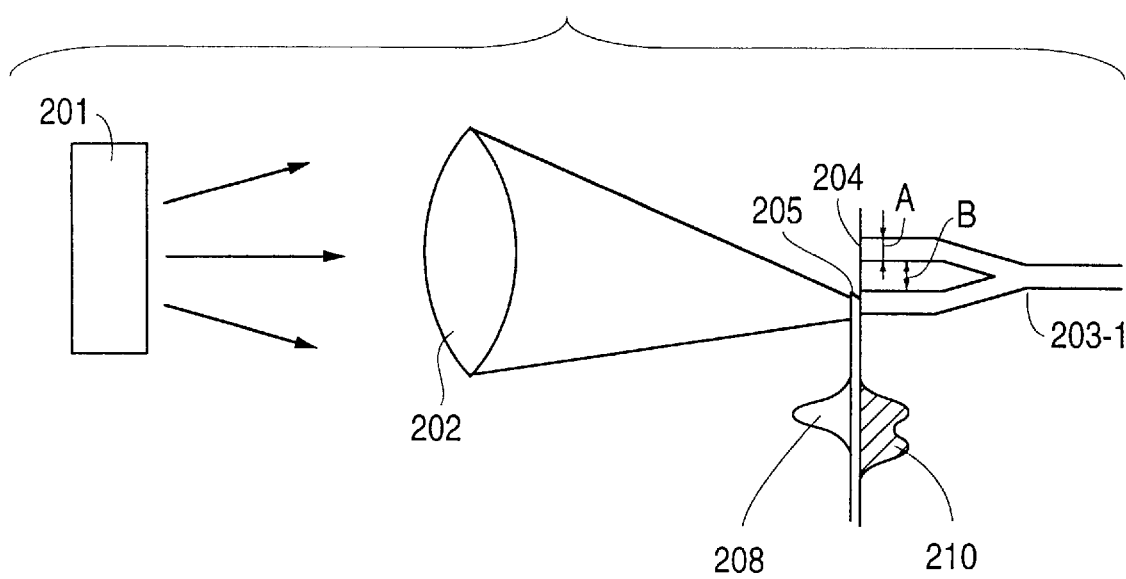
FIG. 10 is a diagram illustrating a portion of the optical demultiplexer illustrated in FIG. 9, according to an embodiment of the present invention.

FIG. 10 is a diagram illustrating a portion of the optical demultiplexer in FIG. 9, but provides a more detailed illustration of the light receiving end of output fiber 203-1. FIG. 10 does not illustrate output fibers 203-2 and 203-2, but these output fibers are present and should have a light receiving end which is the same as that illustrated for output fiber 203-1.

Referring now to FIG. 10, light collected by collective lens 202 has an optical field distribution 208 with a single hump shape. Moreover, each output fiber 203-1–203-3 has a split core at the tip, or light receiving end, of the optical fiber, to provide an optical field distribution 210 with a double-humped shape. More specifically, for example, the light receiving end of output fiber 203-1 has a split core to provide separate tips 204 and 205, so that the optical field distribution of output fiber 203-1 indicates a double-humped shape as viewed, for example, from collective lens 202 in the optical dispersion direction of angular dispersion element 201.

Each tip 204 and 205 provides a "single hump", and the single humps combine together to provide the double-humped shape. If tips 204 and 205 are separated too far apart, the optical field distribution will undesireably appear as two separated, single humps, instead of being a double-humped shape. An optical field distribution with two, separated single humps will not provide the flat, wide transmission range 60 illustrated in FIG. 7 of light transmitted to the output fibers. Therefore, tips 204 and 205 should be separated by an appropriate distance so that there is overlap between the two single humps. The separation distance of tips 204 and 205 will typically depend on the refractive index of the core of the fiber.

For example, if the core of output fiber 203-1 has a relatively high refractive index, each tip 204 and 205 will produce a relatively high amplitude, narrow width "single hump". Therefore, in this case, tips 204 and 205 should be relatively close together to provide an optical field distribution with a double-humped shape. By contrast, if the core of output fiber 2031 has a relatively low refractive index, each tip 204 and 205 will produce a relatively low amplitude, wide "single hump". Therefore, in this case, tips 205 and 205 can be relatively far apart, and still provide an optical field distribution with a double-humped shape.

Typically, for example and depending on the refractive index of the core of output fiber 203-1, the width A illustrated in FIG. 10 is approximately 5 $\mu$m, and the width B illustrated in FIG. 10 is approximately 4 $\mu$m. However, a person of skill in the art can easily determine the precise widths of tips 204 and 205 and the precise separation distance between tips 204 and 205, to provide an optical field distribution with a desired double-humped shape.

Moreover, tips 204 and 205 are preferably not formed as two different fibers, but are formed as if the light receiving end of the output fiber is actually split into two portions. Splitting into two tip portions 204 and 205 will generally result in tip portions 204 and 205 being close enough together so that appropriate overlap occurs between the two single humps so that the resulting optical field distribution indicates a double-humped shape.

When the collected light from collective lens 202 enters output fiber 203-1, the overlap between the optical field distribution 210 of output fiber 203-1 and the optical field distribution 208 of the collected lights causes the light to enter output fiber 203-1. Moreover, since the optical field distribution 210 of output fiber 203-1 has a double-humped shape, the transmittance characteristics of light entering output fiber 203-1 will have the flat, wide transmission range 60 illustrated in FIG. 7, thereby providing a relatively high transmittance to output fiber 203-1 where wavelengths shifted from the center wavelength will still be received into output fiber 203-1.

Tips 204 and 205 gradually combine into one output fiber 203-1 so that the optical field distribution of the output fiber has a single-hump shape as the light travels through the output fiber beyond the light receiving end.

Therefore, according to the above embodiments of the present invention, an optical fiber has an end which splits into first and second arms. The first and second arms provide separated, first and second light paths, respectively, at the light receiving end of the optical fiber, to receive light into the optical fiber. The first and second paths combine together into a single light path in the optical fiber, and together providing a double-hump shaped optical field distribution at the light receiving end.

Figure 11:
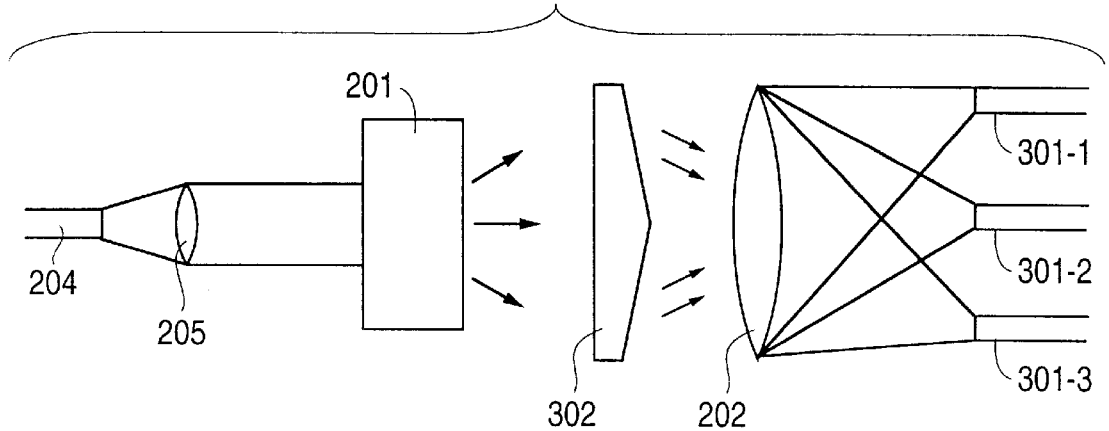
FIG. 11 is a diagram illustrating an optical demultiplexer which uses an angular dispersion element, according to an additional embodiment of the present invention.

FIG. 11 is a diagram illustrating an optical demultiplexer which uses an angular dispersion element, according to an additional embodiment of the present invention. Referring now to FIG. 11, each output fiber 301-1 to 301-3 is a single tip fiber. More specifically, output fibers 301-1 to 301-3 are not split into two tip portions. Instead, a phase mask 302 is provided to transform the optical field distributions of lights dispersed by angular dispersion element 201 so that the optical field distributions have a double-humped shape at the light receiving end.

Referring now to FIG. 11, an optical signal travels through input fiber 204 and is converted into parallel lights by collimating lens 205. Angular dispersion element 201 then forms an output light for each wavelength of the optical signal, where each output light travels in a different direction. The output lights formed by angular dispersion element 201 travel through phase mask 302 so that the output lights are changed in phase and direction by phase mask 302. After travelling through phase mask 302, the output lights are collected by collective lens 202 and focused to output fibers 301-1 to 301-3. Therefore, different wavelengths of the optical signal will be focused to different points by collective lens 202, and therefore received by different output fibers 301-1 to 301-3.

Phase mask 302 causes the optical field distribution of the collected lights at the ends of output fibers 301-1–301-3 to have a double-humped shape, as viewed from collective lens 202 in the direction of the dispersion by angular dispersion element 201. Therefore, instead of splitting the ends of an output fiber to provide an optical field distribution of the output fiber with a double-humped shape, the present embodiment of the present invention uses a phase mask to transform the optical field distribution of light so that the optical field distribution has a double-humped shape. Moreover, a phase mask or a phase mask system could be inserted between collimating lens 205 and angular dispersion element 201.

Figure 12:
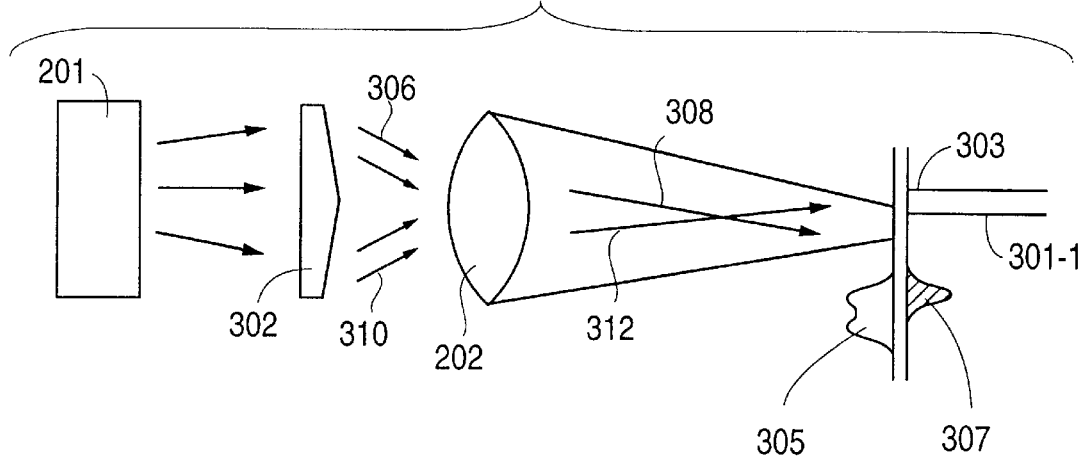
FIG. 12 is a diagram illustrating the operation of the optical demultiplexer illustrated in FIG. 11, according to an embodiment of the present invention.

FIG. 12 is a diagram illustrating the operation of a portion of the optical demultiplexer illustrated in FIG. 11, according to an embodiment of the present invention. To simply the diagram, FIG. 12 illustrates output fiber 301-1, but does not illustrate output fibers 301-2 and 301-2.

Referring now to FIG. 12, phase mask 302 is between angular dispersion element 201 and collective lens 202, and changes the phase of the optical signal output from angular dispersion element 201. The phase changed optical signal is then collected by collective lens 202 and focused to one of output fibers 301-1 to 301-3. The optical field distribution 305 of the collected light indicates a double-humped shape as viewed from angular dispersion element 201 in the travel direction of the optical signal as focused by collective lens 302. In this case, the optical field distribution 307 of each output fiber 301-1 to 301-3 indicates a single-humped shape.

More specifically, light output from angular dispersion element 201 is refracted at the upper portion of phase mask 302 and, as indicated by arrow 306, passes a little downward to enter collective lens 202. This light is collected by collective lens 202 and then travels in the direction indicated by arrow 308 to the focus of collective lens 202. Similarly, light output from angular dispersion element 201 is refracted at the lower portion of phase mask 302 and, as indicated by arrow 310, passes a little upward to enter collective lens 202. This light is collected by collective lens 202 and then travels in the direction indicated by arrow 312 to the focus of collective lens 202. As a result, light travelling from collective lens 202 forms an optical field distribution having a double-humped shape at the focus of collective lens 202.

Thus, a broadband transmittance, as illustrated in FIG. 7, will occur. More specifically, in FIG. 12, the optical field distribution 305 of the collected lights indicates a double-humped shape. In addition, the transmittance depends on the amount of the overlap between the optical field distribution 305 of collected lights and the optical field distribution 307 of a receiving output fiber. As a result, the double-humped shape of the optical field distribution 305 of the collected lights will provide a relatively high transmittance in a broad wavelength range.

Therefore, as described above, the optical field distribution 305 of lights collected by collective lens 202 indicates a double-humped shape in the optical dispersion direction of angular dispersion element 201 by changing the optical field distribution and phase distribution of the light angularly dispersed by angular dispersion element 201 for each wavelength. Thus, the transmission band of light transmitted to output fibers 301-1 to 301-3 can be extended.

Phase mask 302 can be an any form as long as the optical field distribution 305 of the lights collected by collective lens 202 indicates a double-humped shape. For example, FIG. 12 illustrates a side view of phase mask 302. Moreover, a cross-section taken along a line perpendicular to the plane of FIG. 12 would have the same view. As illustrated in FIG. 12, phase mask 302 is a plate having one surface with a raised center. With such a phase mask, the center is, for example, 1–2 μm thicker than the end portion of the plate.

Figure 13:
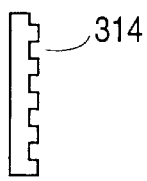
FIGS. 13 and 14 are diagrams illustrating phase masks, according to embodiments of the present invention.

FIG. 13 is a diagram illustrating a phase mask 314 for use instead of phase mask 302. FIG. 13 illustrates a side view of phase mask 314. Moreover, a cross-section taken along a line perpendicular to the plane of FIG. 13 would have the same view. Referring now to FIG. 13, phase mask 314 is designed so that the phase difference between the thick and thin portions of the phase mask is π. Generally, a phase mask is transparent and changes the optical phase by changing the thickness of the transparent material.

Further, an intensity mask can be used in place of either phase masks 302 or 314, to produce the double-humped shape optical field distribution 305 of collected lights.

Figure 14:
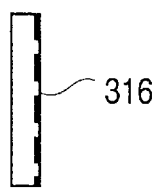

More specifically, FIG. 14 illustrates a side view of an intensity mask 316 for use in place of phase mask 302 in FIG. 12. Referring now to FIG. 14, intensity mask 316 is made of a transparent material but has portions which do not allow light to be transmitted therethrough, so that the collected lights indicate a optical field distribution with a double-humped shape through interference of the light collected by collective lens 302. Intensity mask 316 can be designed to have a slit portion through which no lights can be transmitted. An intensity mask, such as intensity mask 316, functions as cutting off a portion of the lights to be transmitted, thereby causing a loss of light. Accordingly, in this respect, the use of a phase mask (such as phase mask 302 or phase mask 314) is preferable over the use of an intensity mask.

Figure 15:
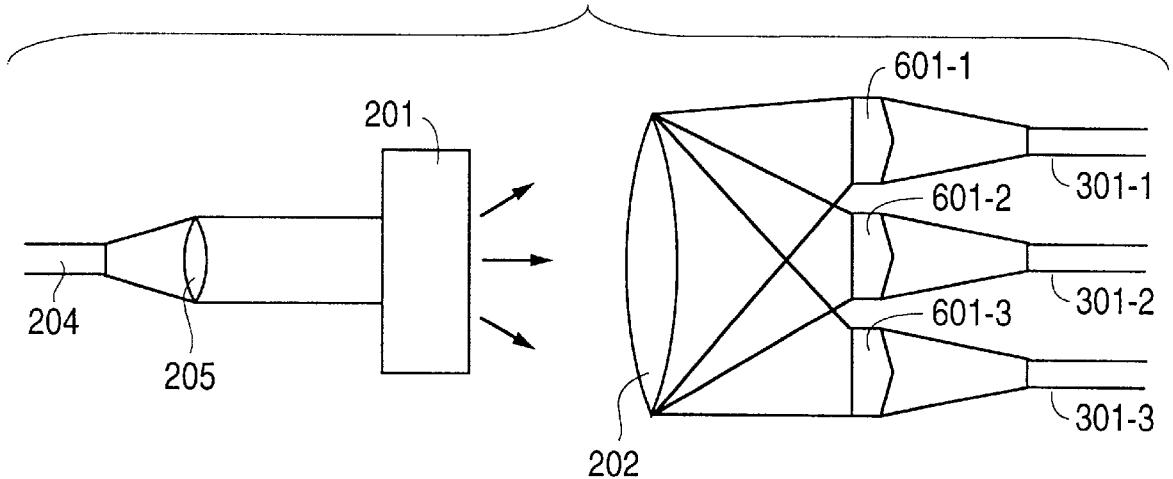
FIG. 15 is a diagram illustrating an optical demultiplexer which uses an angular dispersion element, according to a further embodiment of the present invention.

FIG. 15 is a diagram illustrating an optical demultiplexer which uses an angular dispersion element, according to a further embodiment of the present invention. Referring now to FIG. 15, phase masks 601-1, 601-2 and 601-3 correspond, respectively, to output fibers 301-1, 301-2 and 301-3. Moreover, phase masks 601-1, 601-2 and 601-3 are positioned between collective lens 202 and output fibers 301-1–301-3. This can be contrasted to the embodiment of the present invention illustrated in FIG. 12, where a single phase mask is positioned between angular dispersion element 201 and collective lens 202. Although only three phase masks and output fibers are illustrated in FIG. 15, the actual number of phase masks and output fibers should be equal to the number of multiplexed wavelengths in a light signal to be demultiplexed.

In FIG. 15, a wavelength division multiplexed light travels from input fiber 204 to collimating lens 205. Collimating lens 205 converts the optical signal into parallel lights which are then provided to angular dispersion element 201. Angular dispersion element 201 produces angular dispersed output lights in accordance with wavelength. The angular dispersed output lights are collected by collecting lens 202 and directed to different points depending on wavelength.

Phase masks 601-1–601-3 correspond, respectively, to output fibers 301-1, 301-2 and 301-3, and are provided in the optical paths of light directed by collecting lens 202. More specifically, light directed to output fiber 301-1 is first directed to phase mask 601-1. Phase mask 601-1 changes the phase and direction of the light passing therethrough, and then provides the light to output fiber 301-1. Similarly, light directed to output fiber 301-2 is first directed to phase mask 601-2. Phase mask 601-2 changes the phase and direction of the light passing therethrough, and then provides the light to output fiber 301-2. Further, light directed to output fiber 301-3 is first directed to phase mask 601-3. Phase mask 601-3 changes the phase and direction of the light passing therethrough, and then provides the light to output fiber 301-3.

Therefore, FIG. 15 illustrates phase masks 601-1, 601-2 and 601-3 as being separate units. Such separate phase masks may require precise alignment between the phase masks. However, a single phase mask can be used so that precise alignment between separate phase masks is not required.

Figure 16:
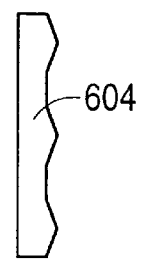
FIG. 16 is a diagram illustrating a molded phase mask, according to an embodiment of the present invention.

For example, FIG. 16 illustrates a molded, single phase mask 604 which can be used in place of separate phase masks 601-1, 601-2 and 601-3. Since phase mask 604 is a single unit, phase mask 604 does not require alignment of a plurality of different phase masks.

Figure 17:
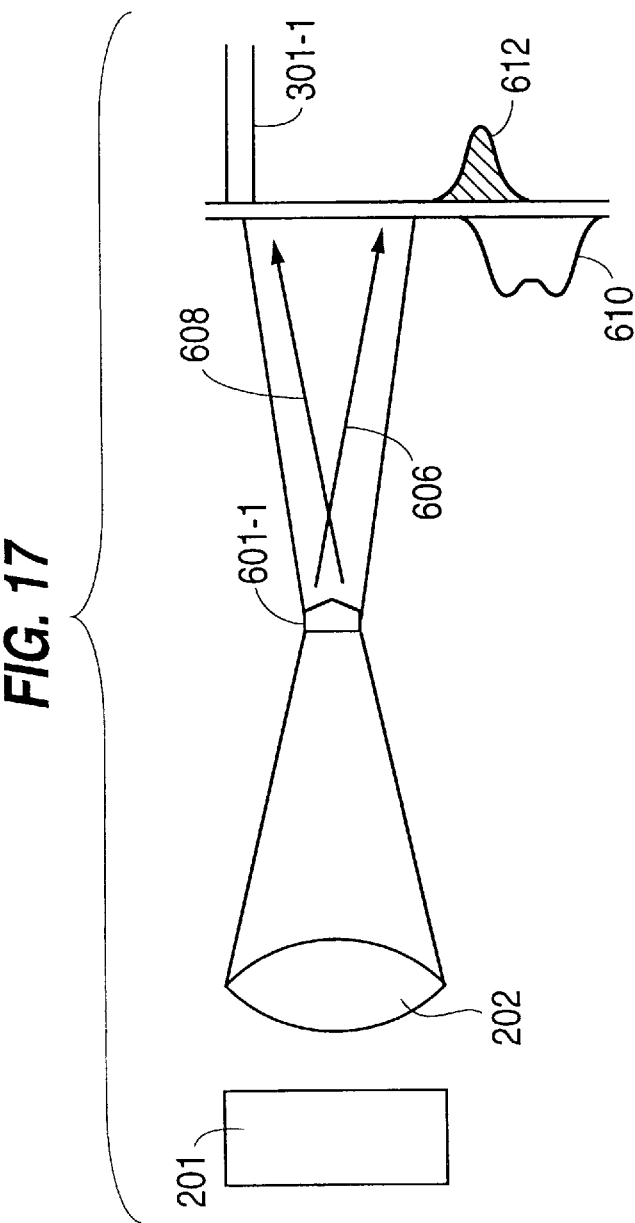
FIG. 17 is a diagram illustrating the operation of the optical demultiplexer illustrated in FIG. 15, according to an embodiment of the present invention.

FIG. 17 is a diagram illustrating the operation of a portion of the optical demultiplexer illustrated in FIG. 15, according to an embodiment of the present invention. To simplify the description, FIG. 17 illustrates only phase mask 601-1 and the corresponding output fiber 301-1, and omits phase masks 601-2 and 601-3 and the corresponding output fibers 301-2 and 301-2. However, the operation of these omitted phase masks and output fibers is the same as that shown for phase mask 601-1 and output fiber 301-1.

Referring now to FIG. 17, the light output from angular dispersion element 201 is collected by collective lens 202 and passes through phase mask 601-1. Phase mask 601-1 changes the optical phase and direction of the light passing therethrough. More specifically, the light passing through the upper portion of phase mask 601-1 proceeds in the direction indicated by arrow 606, and light passing through the lower portion of phase mask 601-1 proceeds in the direction indicated by arrow 608. The light passing through phase mask 601-1 will have an optical field distribution 610 having at double-humped shape at the light receiving end of output fiber 301-1, as viewed in the dispersion direction of angular dispersion element 201. Moreover, the optical field distribution 612 of output fiber 301-1 will have a single hump shape. In this case, as previously described, there will be a relatively high transmittance in a broad range of wavelength of light into output fiber 301-1 due to the overlap of the optical field distribution 610 of the collected light and the optical field distribution 612 of the output fiber. More specifically, the transmittance will be as illustrated in FIG. 7.

As illustrated in FIG. 17, phase mask 601-1 is provided at the point where the wave front of the light from collective lens 202 indicates approximately no curve and becomes parallel to the optical axis of collective lens 202 as a wave front of a plane wave. Since an optical signal having a parallel wave front is input to phase mask 601-1, the effects of phase mask 601-1 approach estimated values, thereby obtaining an optical field distribution of the collected lights in a desirable double-humped shape.

Figure 18:
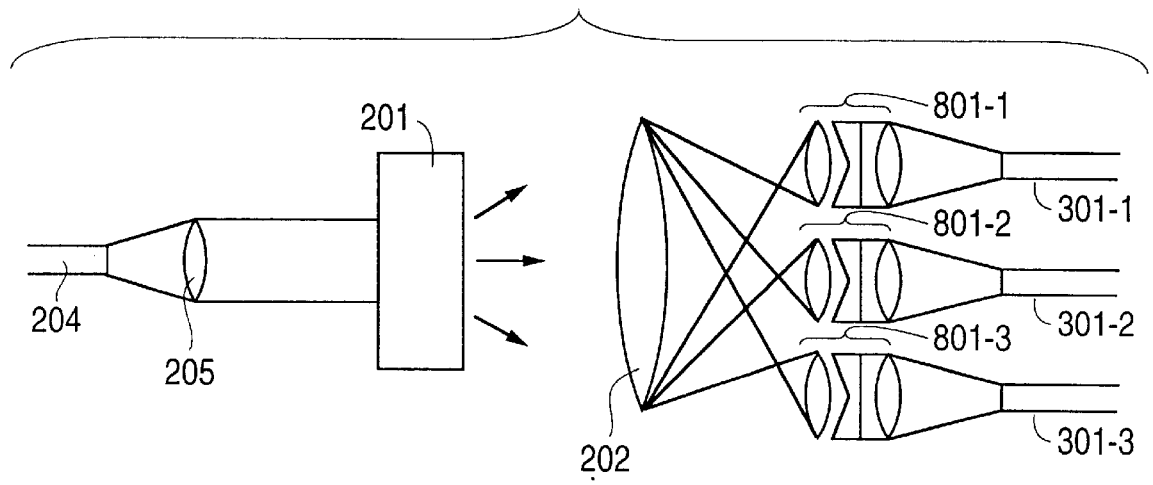
FIG. 18 is a diagram illustrating an optical demultiplexer, according to an embodiment of the present invention.

FIG. 18 is a diagram illustrating an optical demultiplexer, according to an embodiment of the present invention. Referring now to FIG. 18, a wavelength division multiplexed light travels from input fiber 204 to collimating lens 205. Collimating lens 205 converts the optical signal into parallel lights which are then provided to angular dispersion element 201. Angular dispersion element 201 produces angular dispersed output lights in accordance with the wavelengths of the optical signal. The angular dispersed output lights fluxes are collected by collecting lens 202 and directed to different points depending on wavelength.

In addition, a plurality of phase mask systems are used to provide appropriate optical field distributions of the collected lights at the light receiving ends of output fibers 301-1, 301-2 and 301-3. More specifically, phase mask systems 801-1–801-3 correspond, respectively, to output fibers 301-1, 301-2 and 301-3, and are provided in the optical paths of light directed by collecting lens 202. For example, light directed to output fiber 301-1 is first directed to phase mask system 801-1. Phase mask system 801-1 changes the phase and direction of the light passing therethrough, and then provides the light to output fiber 301-1. Similarly, light directed to output fiber 301-2 is first directed to phase mask system 801-2. Phase mask system 801-2 changes the phase and direction of the light passing therethrough, and then provides the light to output fiber 301-2. Further, light directed to output fiber 301-3 is first directed to phase mask system 801-3. Phase mask system 801-3 changes the phase and direction of the light passing therethrough, and then provides the light to output fiber 301-3.

Therefore, FIG. 18 illustrates phase mask systems 801-1, 801-2 and 801-3 as being separate units. Such separate phase mask systems may require precise alignment between the phase mask systems. However, a single phase mask system can be used so that precise alignment between separate phase masks is not required.

Figure 19:
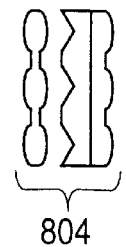
FIG. 19 is a diagram illustrating a molded phase mask, according to an embodiment of the present invention.

For example, FIG. 19 illustrates a molded, single phase mask system 804 which can be used in place of separate phase mask systems 801-1, 801-2 and 801-3. Since phase mask system 804 is a single unit, phase mask system 804 does not require alignment of a plurality of different phase mask systems.

Figure 20:
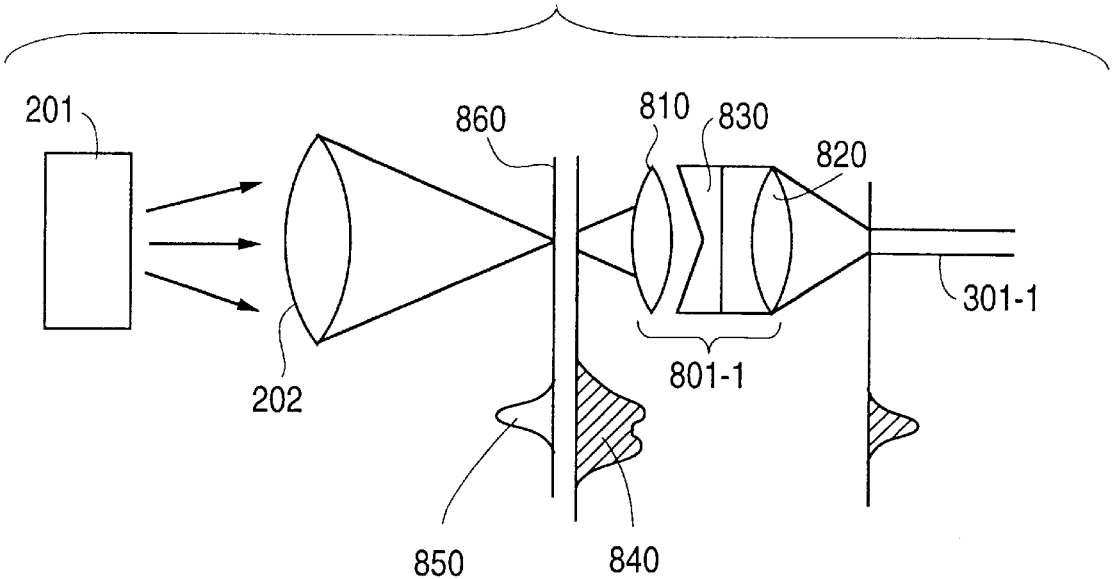
FIG. 20 is a diagram illustrating the operation of the optical demultiplexer illustrated in FIG. 18, according to an embodiment of the present invention.

FIG. 20 is a diagram illustrating the operation of a portion of the optical demultiplexer illustrated in FIG. 18, according to an embodiment of the present invention. To simplify the description, FIG. 20 illustrates only phase mask system 801-1 and the corresponding output fiber 301-1, and omits phase mask systems 801-2 and 801-3 and the corresponding output fibers 301-2 and 3012. However, the operation of these omitted phase mask systems and output fibers is the same as that shown for phase mask system 801-1 and output fiber 301-1.

Referring now to FIG. 20, phase mask system 801-1 is provided between collective lens 202 and output fiber 301-1. Phase mask system 801-1 is illustrated as including collective lenses 810 and 820, and a phase mask 830. Collective lenses 810 and 820 and phase mask 830 are combined together to be a single unit. However, a phase mask system is not intended to be limited to the use of two lenses and a phase mask. Instead, many other phase mask system designs can be employed. For example, a phase mask system may simply include a single lens and a phase mask. Preferably, all the different components in the phase mask system should be connected together as a single unit. By referring to an optical component, such as a phase mask system, as a "single unit", it is intended for the various elements in the optical component to be combined and connected together as a unit, so that the optical component can be separately manufactured and tested outside apart from other units.

Therefore, phase mask system 801-1 comprises at least one lens (such as collective lens 810) and a phase mask (such as phase mask 830). The lens collects light, and the phase mask changes the phase and the optical direction of the light. Referring to FIG. 20, phase mask system 801-1 causes the optical field distribution 840 of output fiber 301-1 to virtually appear as a double-humped shape at a collecting surface 860 before phase mask system 801-1, when viewed from collective lens 202 in the dispersion direction of angular dispersion element 201. Moreover, the optical field distribution 850 of light collected by collective lens 202 has a single hump shape at the focus (which is on collecting surface 860) of collective lens 202, when viewed from collective lens 202 in the dispersion direction of angular dispersion element 201.

With this configuration, the overlap between (a) the optical field distribution 850 of the light incident on phase mask system 801 from collective lens 202 and (b) the optical field distribution 840 (which is the virtual optical field distribution of output fiber 301-1) as actually converted to the optical field distribution of output fiber 301-1 through phase mask system 801-1, will provide an even form at the peak of the transmittance, as illustrated in FIG. 7. Accordingly, the transmission band of optical coupling from collective lens 202 to phase mask system 801-1 is relatively large. Since the light received by phase mask system 801 from collective lens 202 is later provided to output fiber 301-1, the coupling between output fiber 301-1 and the collected lights from collective lens 202 indicates a broad band.

The effective double-humped optical field distribution 840 of output fiber 301-1 before phase mask system 801-1 refers to a double-humped optical field distribution obtained as a result of entering a light from output fiber 301-1 and transmitting the light through phase mask system 801-1. Thus, by using phase mask system 801-1, it is not necessary to use an output fiber having a split tip (as illustrated, for example, in FIG. 9) to obtain a broad transmission band.

Figure 21:
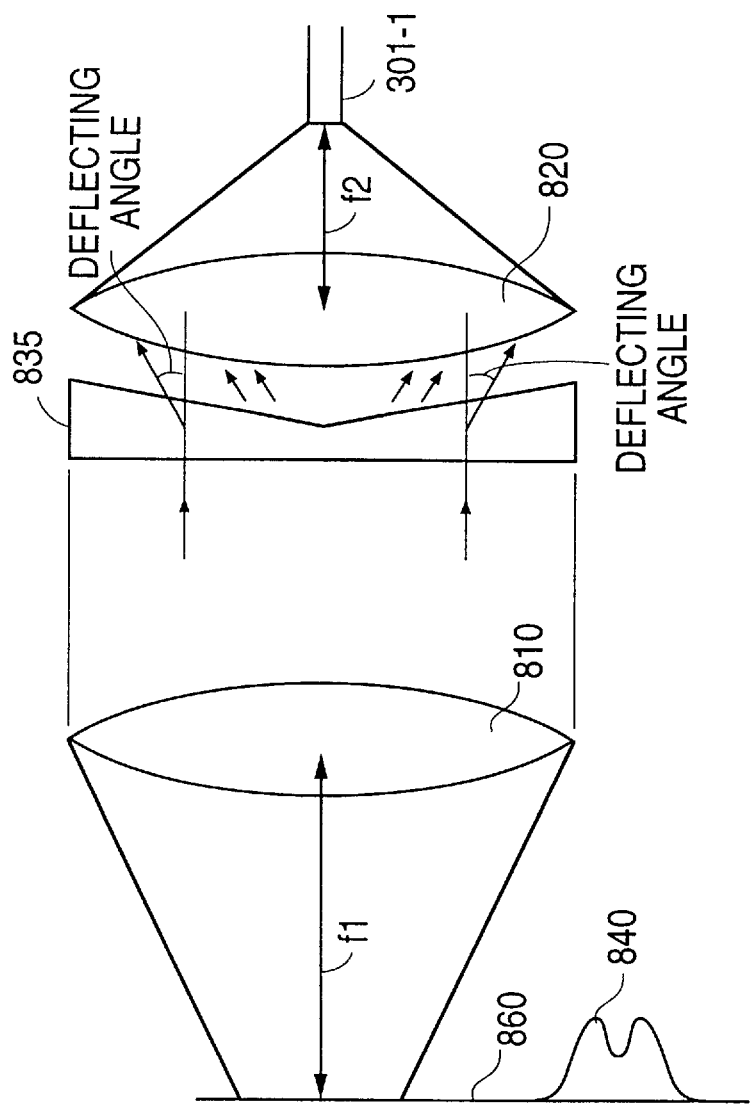
FIG. 21 is a diagram illustrating details of a phase mask system, according to an embodiment of the present invention.

FIG. 21 is a diagram illustrating further details of a phase mask system similar to that illustrated in FIG. 18, according to an embodiment of the present invention. More specifically, FIG. 21 illustrates a phase mask system which includes collective lenses 810 and 820, but the concave phase mask 830 has been replaced with a convex phase mask 835. However, either a concave or a convex phase mask can be used in a phase mask system.

Referring now to FIG. 21, light from collective lens 202 (not illustrated in FIG. 21) is collected by collective lens 810 at a distance $f_1$ from collecting surface 860. Collective lens 810 provides the light to phase mask 835 which changes the phase and direction of the light. The phase and direction changed light is then collected by collective lens 820 and provided to output fiber 301-1. Collective lens 820 is at a distance $f_2$ from the end surface of output fiber 301-1. The distance $f_1$ is the focal length of collective lens 810, and the distance $f_2$ is the focal length of collective lens 820. As shown in FIG. 21, an angle made by the center line of collected lights from collective lens 810 and the center line of the light output from phase mask 835 is referred to as a "deflecting angle". That is, phase mask 835 is a combination of two prisms, and the effect of the prisms of phase mask 835 is to change the direction of the light output by collective lens 810. The change of the optical direction by phase mask 835 is represented by the deflecting angle.

The effective optical field distribution 840 of output fiber 301-1 indicates a double-humped shape on collecting surface 860, and preferably has a constant phase, when viewed from collective lens 810. Moreover, the position of collecting surface 860 corresponds to the light receiving end of output fiber 301-1. Therefore, embodiments of the present invention as illustrated, for example, in FIG. 21, will provide the same effect as embodiments of the present invention illustrated in FIG. 10 where an output fiber has a split end.

Figure 22:
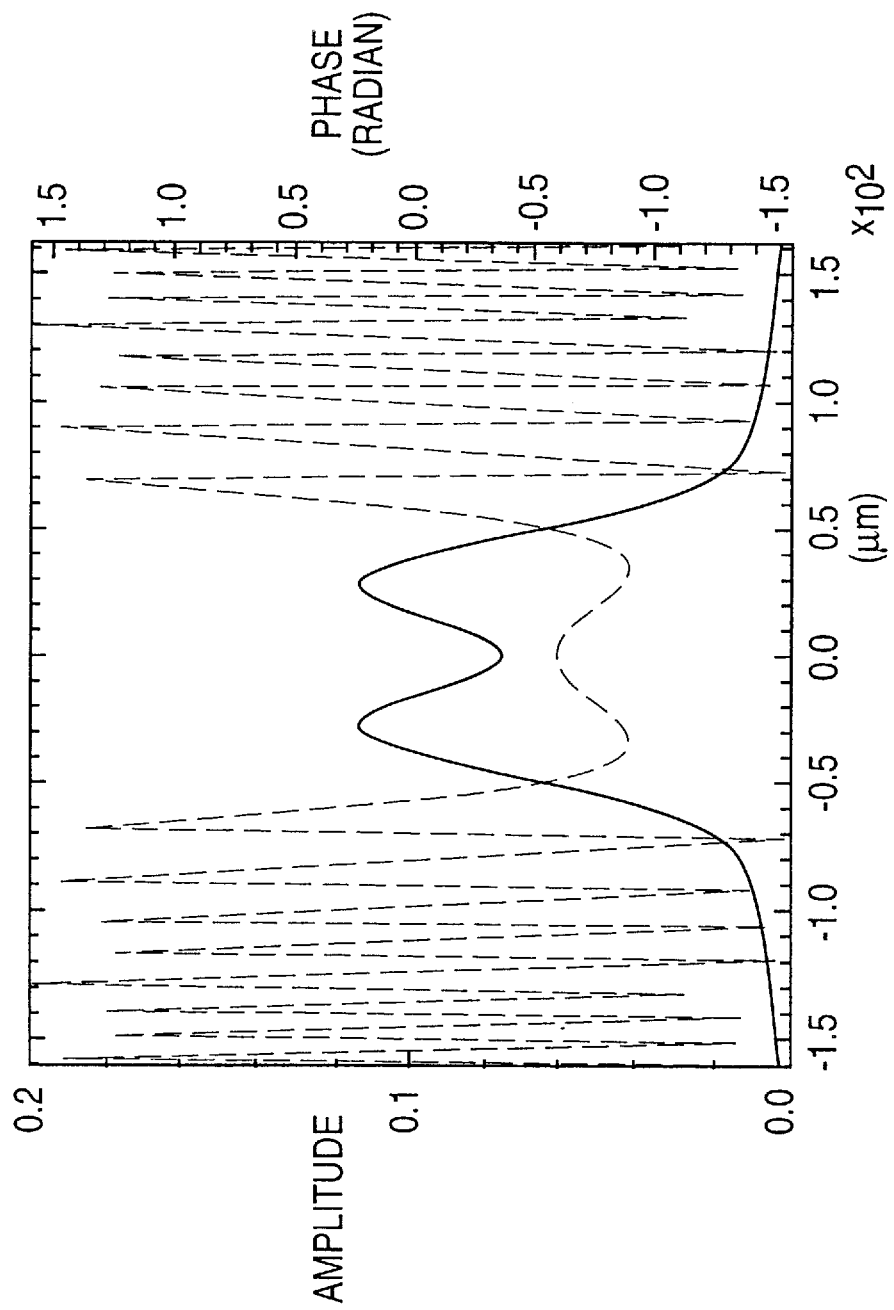
FIG. 22 is a graph illustrating a result of a simulation of optical amplitude and phase on a collecting surface for the embodiment of the present invention illustrated in FIG. 21.

FIG. 22 is a graph illustrating a result of a simulation of the optical amplitude and phase on collecting surface 860 for embodiments of the present invention illustrated in FIG. 21. For this simulation, $f_1$=200 µm, $f_2$=500 µm, and the deflecting angle=3.8°.

The vertical axis in FIG. 22 indicates the amplitude and phase. The amplitude is represented by a relative value, and the phase is represented in radians. The horizontal axis indicates the position on collecting surface 860, and is represented by µm. In the actual simulation, the lights entered through output fiber 301-1, and the optical amplitude and phase were checked on collecting surface 860.

The change in phase on collecting surface 860 is indicated by dotted lines in FIG. 22. As the position is shifted from the center, the change of the phase is less than 0.3 radians in the region of the optical intensity. The solid lines shown in FIG. 22 indicate the optical amplitude distribution on collecting surface 860. As described above, the optical amplitude distribution in the present embodiment indicates a double-humped shape. Thus, using phase mask 835, the optical phase greatly changes at the foot of the optical field distribution form. However, as indicated by the optical amplitude distribution, the optical field is small enough to be ignored at the points where the phase significantly changes. Therefore, the foot of the optical field distribution does not significantly affect the coupling to the output fiber. The phase does not significantly change around the center of the optical field distribution in the double-humped shape.

Figure 24:
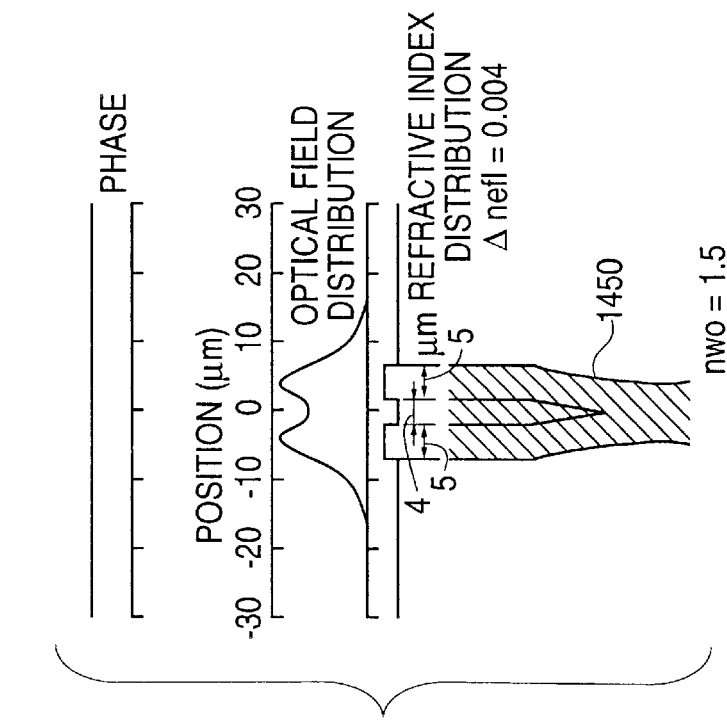
FIG. 24 is a graph illustrating an output fiber or a waveguide to evaluate the effect of the present invention.
Figure 23:
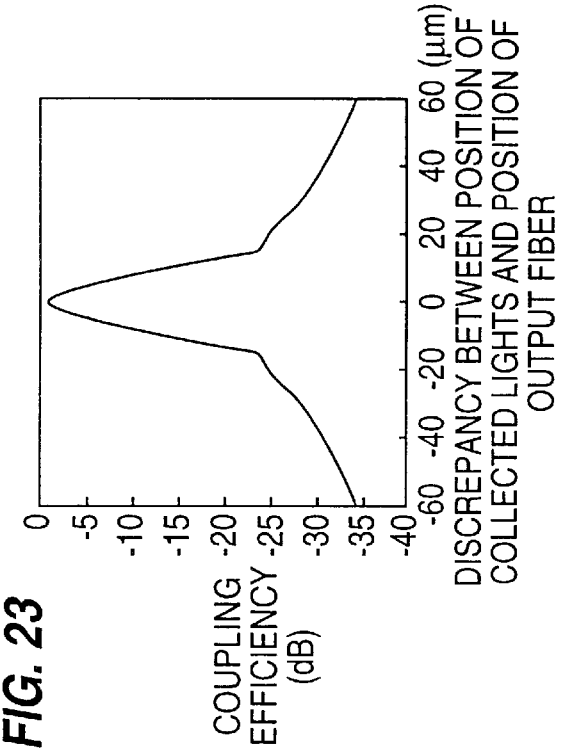
FIG. 23 is a graph illustrating coupling efficiency without employing embodiments of the present invention.
Figure 25:
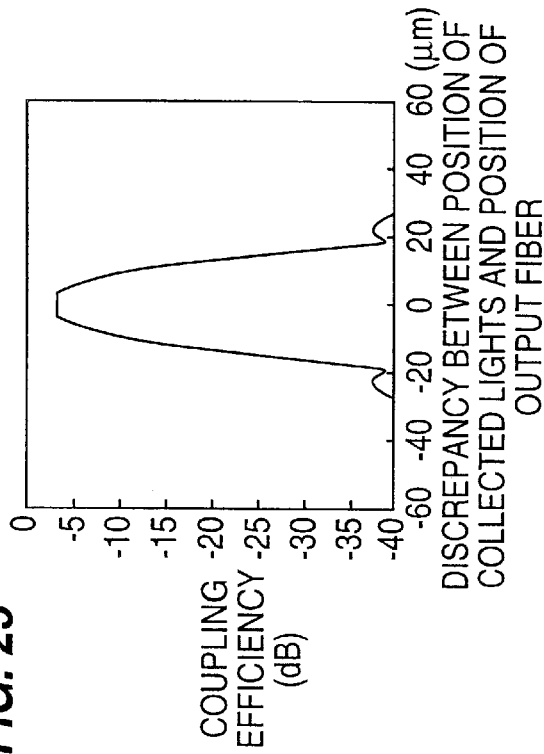
FIG. 25 is a graph showing the coupling efficiency of the collected lights to the output fiber using an output fiber having a split end portion.

FIGS. 23, 24 and 25 are graphs illustrating a simulation of the present invention. In FIGS. 23 and 25, the horizontal axis indicates the discrepancy between the position of collected lights and the position of the output fiber, and the vertical axis indicates the coupling efficiency (equivalent to the transmittance).

More specifically, FIG. 23 shows the coupling efficiency without employing embodiments of the present invention. Thus, neither the optical field distribution of collected lights or the optical field distribution of an output fiber has a double-humped shape. As shown in FIG. 23, the coupling efficiency indicates the form of a mountain with a wide foot and a sharp summit. With a sharp summit of the coupling efficiency, the coupling efficiency is considerably lowered by the slight discrepancy between the position of the collected lights and the position of the output fiber. In addition, when the spectrum is extended by optical modulation, all signals can not be efficiently input to the output fiber.

Since the foot of the distribution form is wide in the example shown in FIG. 23, there is the possibility that a light to be received by the adjacent output fiber is mistakenly received, thereby causing a cross-talk between channels.

FIG. 24 shows the setting for an output fiber or a waveguide to evaluate the effect of the present invention. In this simulation, an embodiment of the present invention as illustrated in FIG. 10 was employed, where an output fiber has a split end. More specifically, referring now to FIG. 24, an output fiber or waveguide 1450 has a end which is split into two portions. The tip is 5 µm thick, and the clearance between the two split portions is 4 µm. The refractive index of the optical transmission portion of the output fiber or waveguide 1450 is 1.5, and the difference between the refractive indices of the transmission portion and the surrounding portion is 0.004. As shown in FIG. 24, it is assumed that the phase of the input light is constant at the end of the output fiber or waveguide 1450. With the above described settings, FIG. 24 shows the refractive index distribution and optical field distribution of the output fiber or waveguide 1450. The position is represented as the distance from the center of the output fiber or waveguide 1450 in the direction of the optical angular dispersion of the angular dispersion element.

As shown in FIG. 24, the optical field distribution indicates a double-humped shape in the direction of angular dispersion from the angular dispersion element, and shows the same form as the optical field distribution described for the embodiment of the present invention illustrated in FIG. 10.

FIG. 25 is a graph showing the coupling efficiency of the collected lights to the output fiber using an output fiber having a split end portion. As shown in FIG. 25, the peak of the coupling efficiency indicates a flat portion. Thus, by allowing a flat portion at the peak of the coupling efficiency, a modulated optical signal can be coupled to the output fiber at a high efficiency even if the spectrum of the light is extended by the modulation.

In FIG. 25, the foot of the graph has a narrowed mountain-like shape, and no lights are input when the collected lights are considerably shifted from the position of the output fiber with the coupling efficiency remarkably reduced. Therefore, when lights having a plurality of wavelengths are simultaneously transmitted and angularly dispersed by an angular dispersion element in wavelength division multiplexing communications, the lights are not coupled to the luminous flux approaching the position shifted from the position of the output fiber. Therefore, there is little possibility that a crosstalk is generated by inputting the light to be input to the adjacent output fiber. Thus, an excellent optical reception is performed.

Figure 26:
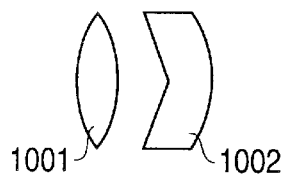
FIGS. 26, 27 and 28 are diagrams illustrating various phase mask systems, according to embodiments of the present invention.
Figure 27:
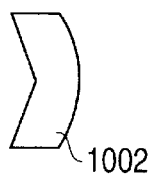
Figure 28:
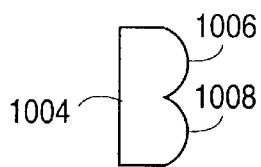

FIGS. 26, 27 and 28 are diagrams illustrating various phase mask systems, according to embodiments of the present invention. For example, FIG. 26 illustrates a phase mask system which includes a lens 1001 and a lens operation assigning phase mask 1002 combined together as a single unit. Lens 1001 functions simply as lens. Lens operation assigning phase mask 1002 functions as phase mask by making the optical field distribution in a corresponding output fiber as a double-humped shape, and also collects lights at the tip of the corresponding output fiber.

FIG. 27 illustrates a phase mask system which includes only lens operation assigning phase mask 1002. Such a one-unit configuration can easily be manufactured and will provide an optical demultiplexer which does not require elaborate alignment of various components in the phase mask system.

FIG. 28 illustrates a lens operation assigning phase mask 1004 which includes lens operating portions 1006 and 1008 for providing a lens function. Since the light processed by a lens operating portion 1003 and the light processed by lens operating portion 1004 proceed as if the phase mask system was split into two separate phase mask systems, the optical field distribution of the output fiber actually indicates a double-humped shape. As in the case shown in FIG. 27, the lens operation and phase mask operation are incorporated into a single unit. Therefore, a simple configuration is obtained, and elaborate alignment is not required.

According to the above embodiments of the present invention, an optical multiplexer or an optical demultiplexer employs an angular dispersion element. For example, see angular dispersion element 34 in FIG. 2, or angular dispersion element 201 in FIGS. 9, 10, 11, 12, 15, 17, 18 and 20. Such an angular dispersion element is typically a conventional diffraction grating. Alternatively, for example, a virtually imaged phased array (VIPA) as disclosed in U.S. patent application titled "VIRTUALLY IMAGED PHASED ARRAY AS A WAVELENGTH DEMULTIPLEXER", Ser. No. 08/685,362, filed Jul. 24, 1996 (hereinafter "VIRTUALLY IMAGED PHASED ARRAY AS A WAVELENGTH DEMULTIPLEXER"), and which is incorporated herein by reference, can be used as an angular dispersion element in an optical multiplexer or an optical demultiplexer in any of the above embodiments of the present invention.

Many different VIPA configuration are disclosed in "VIRTUALLY IMAGED PHASED ARRAY AS A WAVELENGTH DEMULTIPLEXER", and it is not intended for a VIPA to be limited to any specific embodiment. However, generally, a VIPA includes a transparent spacer with first and second reflecting films on opposite sides of the transparent spacer. An entrance window is provided on the transparent window. Light is line focused to be received in the transparent spacer through the entrance window so that the received light undergoes multiple reflection between the first and second reflecting. The reflectance of the first reflecting film is typically 100% and that of the second reflecting film is less than 100% and is typically 95%. Since the reflectance of the second reflecting film is less than 100%, the multiple reflections between the first and second reflecting films causes a plurality of lights to be transmitted through the second reflecting film. The plurality of lights interfere with each other to form a luminous flux having a respective wavelength of the input light and travelling in a direction which is dependent on the wavelength of the light in the luminous flux. Therefore, if the received light is a wavelength division multiplexed light including a plurality of wavelengths, the VIPA will produce a plurality of luminous fluxes corresponding, respectively, to the plurality of wavelengths. Each luminous flux will be output from the VIPA at a different output angle corresponding to the wavelength of light in the luminous flux. Therefore, each luminous flux travels in a different direction than the other luminous fluxes.

However, if a VIPA is used as a demultiplexer or a multiplexer, the configuration may be slightly different than that shown in FIGS. 9, 10, 11, 12, 15, 17, 18 and 20. More specifically, a VIPA should receive line-focused light, as opposed to a diffraction grating which should receive collimated light. Therefore, a lens which line focuses light should be used instead of a collimating lens, to provide light to a VIPA. More specifically, for example, referring to FIG. 9, assume that angular dispersion element 201 is a VIPA. In this case, a lens which line focuses light should be used instead of collimating lens 205.

Figure 29:
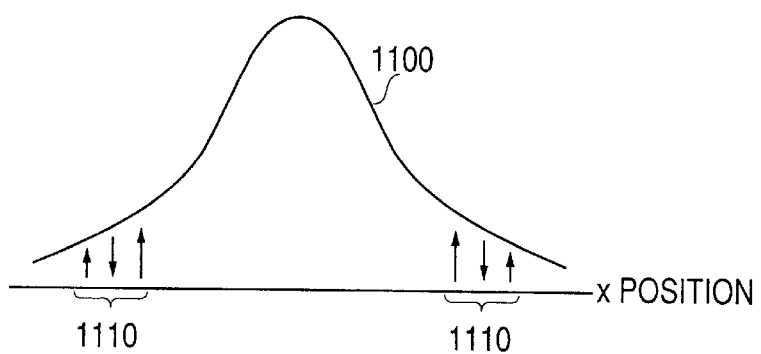
FIGS. 29, 30 and 31 are diagrams illustrating the operation of an optical demultiplexer when a VIPA is used as an angular dispersion element and the optical field distribution of an output fiber has a double-hump shape, according to embodiments of the present invention.
Figure 30:
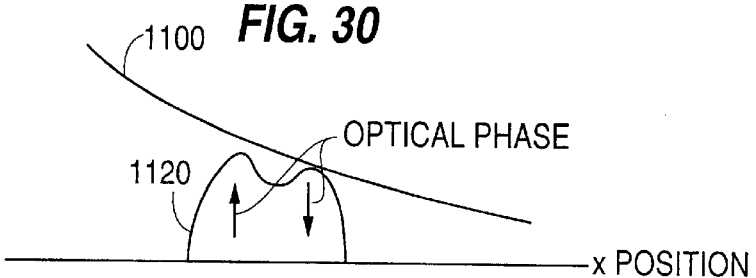
Figure 31:
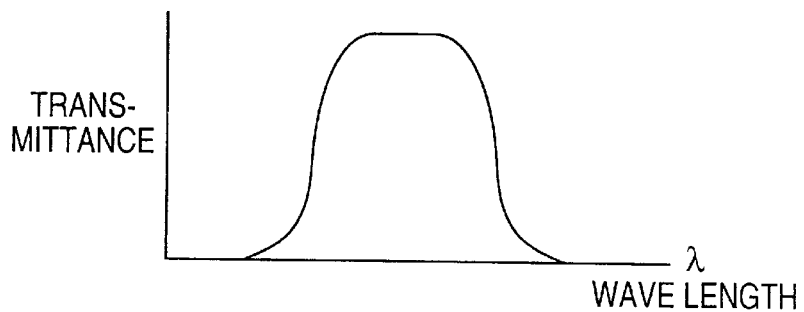

FIGS. 29, 30 and 31 are diagrams illustrating the operation of an optical demultiplexer when a VIPA is used as an angular dispersion element and the optical field distribution of an output fiber has a double-hump shape, according to embodiments of the present invention.

More specifically, FIG. 29 is a graph illustrating the optical field distribution 1100 of a luminous flux formed by a VIPA. Referring now to FIG. 29, the optical field distribution 1100 has a single-hump shape, and the optical phase 1110 rapidly rotates around the foot of the single-humped shape. That is, around the foot of the single-humped shape, the optical phase 1110 greatly changes with the slightest change in position.

Moreover, assume that a VIPA produces light having an optical field distribution 1100 as illustrated in FIG. 29, and that the light is to be transmitted to a first output fiber, but is not to be transmitted to a second output fiber which is adjacent to the first output fiber. If the second optical fiber has an optical field distribution with a single-humped shape, lights around the foot of the single-hump shape of the optical field distribution 1100 of light formed by the VIPA and having the same phase will be undesireably transmitted to the second output fiber.

However, if the optical field distribution of each output fiber has a double-humped shape, then a larger amount of light from the foot of the optical field distribution 1100 of light from the VIPA will be transmitted to the second fiber. Since this larger amount of light will include lights having different phases, these different phase lights will attenuate each other, thereby actually reducing the amount of crosstalk between the first and second output fibers.

FIG. 30 is a graph illustrating a case where the overlap between the optical field distribution 1120 of an output fiber and the optical field distribution 1100 of light from a VIPA causes lights of different phases to be included in the overlap. These different phase lights proceed through the output fiber and are then multiplexed together. The multiplexing of the different phase lights causes the different phase lights to attenuate, or offset, each other.

FIG. 31 is a graph illustrating the transmittance of light from an angular dispersion element to an output fiber of a demultiplexer, where a VIPA is used as the angular dispersion element, according to an embodiment of the present invention. As illustrated in FIG. 31, the transmittance can approach a rectangular form, which is an ideal form of the transmittance. Such a transmittance can be obtained when a VIPA is used as an angular dispersion element in any of the above embodiments of the present invention.

According to the above embodiments of the present invention, either the optical field distribution of lights to be received by an optical fiber, or the optical field distribution of the optical fiber, has a double-humped shape and preferably has a constant phase, to thereby increase the transmission band of light transmitted to the optical fiber. Therefore, even if the wavelength of lights to be coupled to the optical fiber experiences a slight wavelength shift, the lights will still be transmitted to the optical fiber at a relatively high transmittance. Moreover, even if the position of the optical fiber is slightly shifted, the light having the wavelength to be transmitted to the optical fiber will be transmitted to the optical fiber at a relatively high transmittance. Further, even if the light is modulated and the spectrum is extended, the entire extended spectrum can be transmitted to the optical fiber at a high transmittance.

According to the above embodiments of the present invention, a phase mask or an intensity mask is used to transform the optical field intensity of light. However, a filter can also be used for this purpose.

Figure 32:
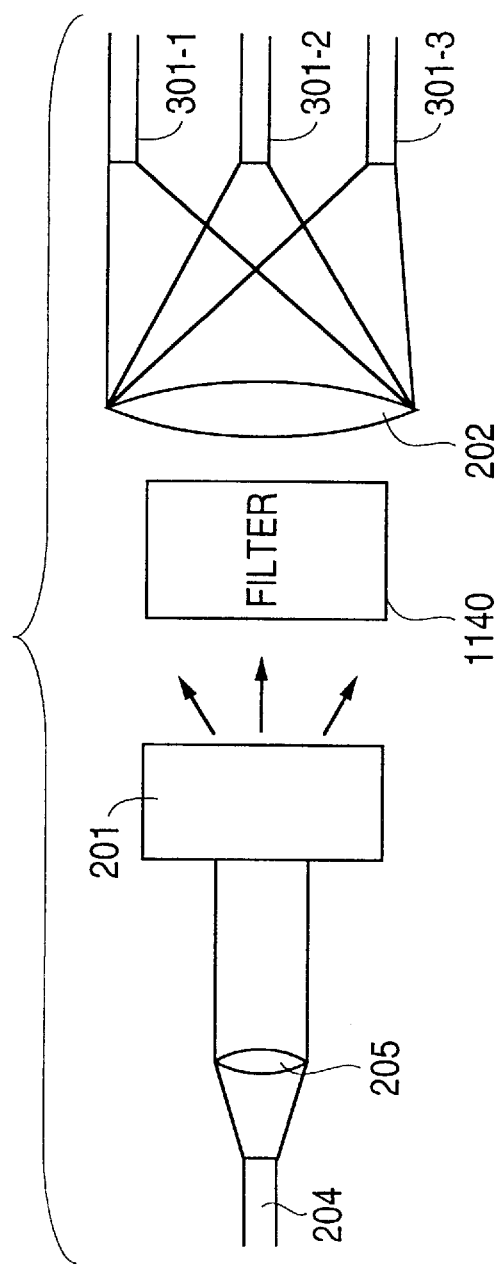
FIG. 32 is a diagram illustrating an optical demultiplexer which uses an angular dispersion element, according to an additional embodiment of the present invention.

For example, FIG. 32 is a diagram illustrating an optical demultiplexer which uses a filter to transform the optical field intensity of light, according to an additional embodiment of the present invention. FIG. 32 is the same as FIG. 11, except that phase mask 302 in FIG. 11 has been replaced with filter 1140. Filter 1140 changes the shape of the optical field distribution of light output from angular dispersion element 201 before the light enters collective lens 202. Generally, filter 1130 changes the shape of the optical field distribution in accordance with the characteristics of the surface area of the filter through which the light passes. Such filters are known.

Therefore, according to above embodiments of the present invention, a filter changes the passing direction of light, depending on the area of the filter surface. The filter is provided between an angular dispersion element and an optical collecting system so that the optical field distribution of the collected light from the angular dispersion element at the end of an optical output path indicates a double-humped shape.

According to the above embodiments of the present invention, a light output from a angular dispersion element can be transmitted at a high efficiency to an optical path by causing the optical path to have either an actual or a virtual optical field distribution with a double-humped shape. Alternatively, the light can be transformed to have an optical field distribution with a double-humped shape.

According to the above embodiments of the present invention an optical field distribution has a double-humped shape, whether actual or virtual. Therefore, the embodiments of the present invention are not intended to be limited to either an "actual" or a "virtual" optical field distribution. Instead, an optical fiber or a light is considered to have an optical field distribution with a double-humped shape if such a shape is either actual or virtual.

The above embodiments of the present invention are described as relating to the transmission of light to an optical fiber. However, the embodiments of the present invention are not intended to be limited to the transmission to an optical fiber, and can be applied to the transmission of light to, for example, other types of optical waveguides or simply to an optical path.

The above embodiments of the present invention are described as relating to an optical demultiplexer or an optical multiplexer. However, the embodiments of the present invention are not intended to be limited to use with an optical demultiplexer or an optical multiplexer, and can be used in many other optical devices, such as optical devices which couple light to an optical fiber, and optical waveguide or an optical path.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical waveguide having a light receiving end and a propagation mode with a double-hump shaped optical field distribution at the light receiving end to receive light into the optical waveguide, wherein substantially the total Power of the propagation mode is converted into a single, non-double-hump shaped optical field distribution.

2. An optical waveguide as in claim 1, wherein substantially the total power of the propagation mode is converted into the single, non-double-hump shaped optical field distribution as the light travels through the optical waveguide.

3. An optical waveguide as in claim 1, wherein the double-hump shaped optical field distribution has a constant phase.

4. An optical waveguide as in claim 1, wherein the optical waveguide includes first and second light paths separated from each other at the light receiving end to receive light into the optical waveguide through the first and second light paths, the first and second light paths combining together into a single light path in the optical waveguide and providing the double-hump shaped optical field distribution at the light receiving end.

5. An optical waveguide as in claim 1, wherein the optical waveguide is an optical fiber having an end which splits into first and second arms, the first and second arms providing separated, first and second light paths, respectively, at the light receiving end to receive light into the optical fiber and which combine together into a single light path in the optical fiber, the first and second light paths together providing the double-hump shaped optical field distribution at the light receiving end.

6. An optical waveguide as in claim 1, wherein the optical waveguide is an optical fiber.

7. An apparatus comprising:
   an angular dispersion element which receives an input light and produces an output light having an output angle corresponding to the wavelength of the input light; and an optical waveguide having a light receiving end and a propagation mode with a double-hump shaped optical field distribution at the light receiving end, the output light of the angular dispersion element being incident on the light receiving end of the optical waveguide to be received in the optical waveguide.

8. An apparatus as in claim 7, further comprising:

a lens for focusing the output light of the angular dispersion element on the light receiving end of the optical waveguide.

9. An apparatus as in claim 7, wherein the propagation mode is converted into a non-double-hump shaped optical field distribution as the output light travels through the optical waveguide.

10. An apparatus as in claim 7, wherein the double-hump shaped optical field distribution has a constant phase.

11. An apparatus as in claim 7, wherein the optical waveguide includes first and second light paths separated from each other at the light receiving end to receive the output light of the angular dispersion element into the optical waveguide through the first and second light paths, the first and second light paths combining together into a single light path in the optical waveguide and providing the double-hump shaped optical field distribution at the light receiving end.

12. An apparatus as in claim 7, wherein the optical waveguide is an optical fiber having an end which splits into first and second arms, the first and second arms providing separated, first and second light paths, respectively, at the light receiving end to receive the output light of the angular dispersion element into the optical fiber and which combine together into a single light path in the optical fiber, the first and second light paths together providing the double-hump shaped optical field distribution at the light receiving end.

13. An apparatus as in claim 7, wherein the optical waveguide is an optical fiber.

14. An apparatus comprising:

a transforming device through which a light travels to a receiving surface, the light having an optical intensity distribution and the transforming device transforming the optical intensity distribution so that the light has a double-hump shaped optical intensity distribution at the light receiving surface; and an optical waveguide receiving the light at the light receiving surface and having a propagation mode with a single, non-double-hump shape optical field distribution so that substantially the total power of the light is received into the optical waveguide.

15. An apparatus as in claim 14, wherein the transforming device comprises a filter for transforming the optical intensity distribution of the light.

16. An apparatus as in claim 14, wherein the transforming device comprises a phase mask for changing the phase of the light and thereby transforming the optical field intensity distribution of the light.

17. An apparatus as in claim 14, wherein the transforming device comprises a phase mask and a lens which together change the phase of the light, and thereby transform the optical field intensity distribution of the light.

18. An apparatus as in claim 14, wherein the transforming device comprises an intensity mask having an transmittance distribution in a plane through which the light passes, to thereby transform the optical field intensity distribution of the light.

19. An apparatus as in claim 14, wherein the double-hump shaped optical field distribution has a constant phase.

20. An apparatus comprising:

an angular dispersion element which receives an input light and produces an output light having an output angle corresponding to the wavelength of the input light, the output light having an optical intensity distribution and being provided to a receiving surface of an optical path; and a transforming device which transforms the optical intensity distribution of the output light so that the output light has a double-hump shaped optical intensity distribution at the light receiving surface of the optical path.

21. An apparatus as in claim 20, wherein the transforming device comprises a filter for transforming the optical intensity distribution of the output light.

22. An apparatus as in claim 20, wherein the transforming device comprises a phase mask for changing the phase of the output light and thereby transform the optical field intensity distribution of the output light.

23. An apparatus as in claim 20, wherein the transforming device comprises a phase mask and a lens which together change the phase of the output light, and thereby transform the optical field intensity distribution of the output light.

24. An apparatus as in claim 20, wherein the transforming device comprises an intensity mask having an transmittance distribution in a plane through which the output light passes, to thereby transform the optical field intensity distribution of the output light.

25. An apparatus as in claim 20, further comprising:

an optical fiber having the optical path therein, the receiving surface of the optical path being at an end of the optical fiber.

26. An apparatus as in claim 20, further comprising:

an optical waveguide having the optical path therein, the receiving surface of the optical path being at an end of the optical waveguide.

27. An apparatus as in claim 20, further comprising:

a lens which receives the output light from the angular dispersion element and directs the output light to the transforming device so that the transforming device transforms the optical intensity distribution of the directed output light.

28. An apparatus as in claim 20, further comprising:

a lens which receives the optical intensity distribution transformed output light from the transforming device and directs the optical intensity distribution transformed output light to the receiving surface of the optical path.

29. An apparatus as in claim 28, wherein the transforming device comprises a phase mask for changing the phase of the output light and thereby transform the optical field intensity distribution of the output light.

30. An apparatus as in claim 28, wherein the transforming device comprises a phase mask and a lens which together change the phase of the output light, and thereby transform the optical field intensity distribution of the output light.

31. An apparatus as in claim 28, wherein the transforming device comprises an intensity mask having an transmittance distribution in a plane through which the output light passes, to thereby transform the optical field intensity distribution of the output light.

32. An apparatus as in claim 20, wherein the double-hump shaped optical field distribution has a constant phase.

33. An optical waveguide having a light receiving end and a propagation mode with a double-hump shaped optical field distribution at the light receiving end to receive light into the optical waveguide, wherein the optical waveguide includes first and second light paths separated from each other at the light receiving end to receive light into the optical waveguide through the first and second light paths, the first and second light paths combining together into a single light path in the optical waveguide and providing the double-hump shaped optical field distribution at the light receiving end.

34. An optical waveguide having a light receiving end and a propagation mode with a double-hump shaped optical field distribution at the light receiving end to receive light into the optical waveguide, wherein the optical waveguide is an optical fiber having an end which splits into first and second arms, the first and second arms providing separated, first and second light paths, respectively, at the light receiving end to receive light into the optical fiber and which combine together into a single light path in the optical fiber, the first and second light paths together providing the double-hump shaped optical field distribution at the light receiving end.

35. A transforming device through which a light travels to a receiving surface, wherein the light has an optical intensity distribution and the transforming device transforms the optical intensity distribution so that the light has a double-hump shaped optical intensity distribution at the light receiving surface, and the transforming device comprises a filter for transforming the optical intensity distribution of the light.

36. A transforming device through which a light travels to a receiving surface, wherein the light has an optical intensity distribution and the transforming device transforms the optical intensity distribution so that the light has a double-hump shaped optical intensity distribution at the light receiving surface, and the transforming device comprises a phase mask for changing the phase of the light and thereby transforming the optical field intensity distribution of the light.

37. A transforming device through which a light travels to a receiving surface, wherein the light has an optical intensity distribution and the transforming device transforms the optical intensity distribution so that the light has a double-hump shaped optical intensity distribution at the light receiving surface, and the transforming device comprises a phase mask and a lens which together change the phase of the light, and thereby transform the optical field intensity distribution of the light.

38. A transforming device through which a light travels to a receiving surface, wherein the light has an optical intensity distribution and the transforming device transforms the optical intensity distribution so that the light has a double-hump shaped optical intensity distribution at the light receiving surface, and the transforming device comprises an intensity mask having an transmittance distribution in a plane through which the light passes, to thereby transform the optical field intensity distribution of the light.

* * * * *